Oct. 28, 1958 G. H. SCHERR Re. 24,557

MEANS FOR ASSESSING THE EFFECT OF VARIOUS AGENTS ON THE GROWTH OF MICROORGANISMS

Original Filed March 1, 1954

INVENTOR

George H. Scherr

BY Parker & Carter

ATTORNEYS

United States Patent Office

Re. 24,557

Reissued Oct. 28, 1958

24,557

MEANS FOR ASSESSING THE EFFECT OF VARIOUS AGENTS ON THE GROWTH OF MICROORGANISMS

George H. Scherr, Park Forest, Ill.

Original No. 2,787,581, dated April 2, 1957, Serial No. 413,060, March 1, 1954. Application for reissue May 26, 1958, Serial No. 737,988

8 Claims. (Cl. 195—103.5)

Matter enclosed in heavy brackets [ ] appears in the original patent but forms no part of this reissue specification; matter printed in italics indicates the additions made by reissue.

The utilization of a disc of paper impregnated with a solution containing an antibiotic as a method of assaying the concentration of the antibiotic, was reported by Vincent and Vincent (Proc. Soc. Exp. Biol. and Med., 55: 162–164, 1944). Their procedure required wetting the disc just prior to its use and implanting the disc, still wet, on a petri dish containing a suitable medium which had been inoculated with the test organism. The innovation of drying similarly impregnated discs so that they might be stored for extended periods of time was a technique proposed by Soto (Puerto Rico J. of Pub. Health and Trop. Med., 25: 96–100, 1949). Soto suggested that dried discs of paper impregnated with carbohydrates could be used in a simplified fermentation test for various microorganisms. The advantage of a previously impregnated and dried disc as a tool for the determination of bacterial sensitivity to antibiotics, sulfonamides, and other chemotherapeutic agents was soon recognized and reported by such workers as Hoyt and Levine (Science, 106: 171, 1947), who incorporated the chemotherapeutic agents into compressed and dried tablets, and Severens (Bacteriolog. Proceedings, p. 65, 1950), who demonstrated the advantages and stability of dried circular paper discs impregnated with various chemotherapeutic agents.

In practice, the conventional method of determining microbial sensitivity to an antibiotic or other chemotherapeutic agent by the paper disc method is as follows:

Discs approximately 10 mm. in diameter are cut from a sheet of paper such as filter or blotting paper and are submerged in a solution or suspension containing a known concentration of the antibiotic. The discs are removed, drained, and dried either at or near room temperature and at atmospheric pressure or in vacuo over a drying agent. These dried discs may be stored for an extended period of time. Bacterial infected material taken from a patient, such as sputum, drainage from an abscess, nasal discharge, or any similar material, is evenly spread on the surface of a suitable solid medium contained in a petri dish, utilizing the usual laboratory methods. The antibiotic-impregnated discs are placed on the surface of the medium and the plate is incubated, usually at 37° C. During the period of incubation the antibiotic impregnated in the disc diffuses out into the medium, its concentration being greater at the perimeter of the disc and decreasing with the increase in distance from the edge of the disc. If the bacteria that grow out on the medium are resistant to the antibiotic they will grow right up to the edge of the disc impregnated with that antibiotic; if the bacteria are susceptible to the bacteriostatic or bacteriocidal activity of the antibiotic, there will be a clear zone around the disc containing the antibiotic which inhibited them. In general, and dependng upon certain conditions, the diameter of the zone of inhibition represents the degree of bacteriostatic or bacteriocidal activity of that antibiotic for the bacteria on the surface of the medium; the greater the zone of inhibition, the greater is the bacteriostatic activity.

With the introduction of numerous newer antibiotics, in part made necessary by the occurrence of strains of antibiotic-resistant bacteria from originally antibiotic-susceptible strains, it has become necessary to employ more than one antibiotic, and consequently more than one disc, when testing a culture in order to ascertain what antibiotic agent will most effectively suppress it. The invention described herein is designed to add to the efficiency of assessing the effectiveness of multiple antibiotic agents against microorganisms.

I illustrate my invention more or less diagrammatically in the accompanying drawing wherein—

Figure 1:
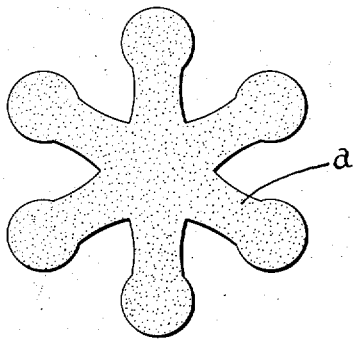
Figure 1 is a plan view of one form of my invention.
Figure 2:
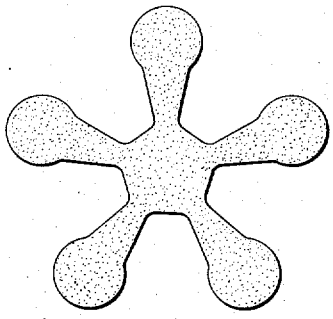
Figure 2 is a plan view illustrating a variant form of my invention.
Figure 3:
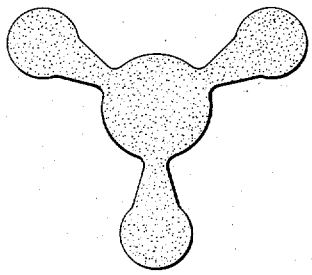
Figure 3 is a plan view of another variant form of my invention.

Figure 1 illustrates the shape of a piece of paper with six projecting arms or strips arranged around its perimeter. Each of the arms, of which the arm designated (a) may be considered representative, is impregnated with a different antibiotic, the required concentration of each antibiotic being readily determined experimentally. These impregnated paper discs are then dried in vacuo over a drying agent and may be stored in a closed container for exended periods of time. In use, the procedure for handling the specimen does not differ from that described above for simple circular paper discs impregnated with a single antibiotic. After the specimen has been streaked out onto the medium, the disc with a different dried antibiotic in and on the tip of each of the projecting arms (a) is placed in the center of the inoculated petri dish which is then suitably incubated. The end of each arm (a) may readily be differentiated from the others by some suitable code of numbers or letters printed on each of the projecting arms. The areas around the ends of said projecting arms will be free of bacterial growth if the antibiotic impregnated in that projecting arm can suppress the bacteria on the plate. If the antibiotic or that particular concentration of antibiotic cannot suppress the bacteria which have been inoculated onto the plate, then the bacteria, after a suitable period of incubation and under the conditions of the experiment, will have grown right up to the edge of the projecting arm (a).

The advantages of this invention of a modified type of paper disc as described above and illustrated in Figure 1 are:

It is time saving. The time required to place a disc of paper impregnated with six different antibiotics, such as that illustrated in Figure 1, onto a petri dish is approximately one-sixth the time required to place six different discs, each impregnated with a different antibiotic, onto a similar petri dish.

It is labor saving. The amount of labor required to separately remove six different discs of paper, each disc impregnated with a different antibiotic, from six different closed containers, would be at least six times as great as the operation of removing one disc of the type illustrated in Figure 1, which can be impregnated with the same six antibiotics. In addition, the amount of labor required for shipping, handling, and storing six separate containers, each one containing discs impregnated with a single antibiotic, is greater than that required for a single container in which the discs are of the type proposed by this invention and illustrated in Figure 1.

The invention described here and illustrated in Figure 1 will reduce the chanes of contaminating the specimen contained on the medium, since a single operation is used when the cover of the petri dish is opened and a disc of the type illustrated in Figure 1 is set in place on the surface of the medium; this single operation would replace the six separate such operations presently required with the use of the single discs impregnated with a single antibiotic.

The type of disc illustrated in Figure 1 and described above retains all the advantages of the simple circular disc impregnated with a single antibiotic. Thus, within certain limits of concentrations of the antibiotics and under a standard set of conditions, the diameter of the zone of inhibition for a susceptible organism will increase with an increase in concentration of the antibiotic. Also, a mixture of two antibiotics may be impregnated on one end of the arm (a); by comparing the diameter of the zone of inhibition thus produced to the diameter of the zones of inhibition manifest when these two antibiotics are used separately, it can be ascertained if the effect of any two antibiotics on the bacteria in question is, at least in vitro, synergistic, additive, indifferent, or antagonstic.

Another unique advantage of the invention described here is that, since all the impregnated tips of the arms (a) are part of the same piece of paper and the paper is porous, the moisture content is more uniform throughout all the portions of this disc and also throughout those portions impregnated with the antibiotics. This is unlike the situation on a petri dish implanted with six individual discs, where a drop or two of moisture collecting on one disc and not on the others would change the rates of diffusion of the antibiotics into the medium and also alter their relative concentrations in the medium. A complication of this kind would be especially important in detecting synergistic activity, where the relative concentrations of the antibiotics alone and in combination must remain relatively constant.

Although the usual type of material from which discs to be impregnated with an antibiotic are cut is usually a filter or blotting type of paper, it is clear that any material, such as cloth or cardboard could be used if it can be impregnated with a solution of a chemotherapeutic agent and suitably dried and stored.

Although the most common chemotherapeutic agents which are used in the current paper-disc-type of sensitivity test are the antibiotics and sulfonamides, it is clear that any chemotherapeutic agent or in fact any chemical agent which can be adsorbed or absorbed onto or into a piece of paper, cloth, or similar material, can be utilized in the technique for evaluating bacteriostatic or bacteriocidal activity by the method described above.

The invention described here could also be used to determine the nutritional requirements of microorganisms. By this method each of the projecting arms (a) of the type of disc shown in Figure 1 is impregnated with a solution of a different sugar and the disc is dried in vacuo over a drying agent or by some similar or other suitable method. The microorganism to be tested is then inoculated onto the surface of a medium whose components contain all the essential ingredients for growth of the particular microorganism except a suitable source of carbon such as the sugars or other carbohydrates or even an inorganic source of carbon. If the organism can utilize the sugar or other source of carbon impregnated in one of the arms (a) as shown in Figure 1, there will be growth of the organism in the immediate vicinity of that impregnated arm; if the organism cannot use that compound as a sole source of carbon, then there will be no growth in that same area. Similar tests could be performed with amino acids, vitamins, or any other substance, element, or class of compounds utilized in determining the nutritional requirements of various microorganisms, the composition of the medium being modified according to the substances being studied.

Although the shape of the invention described here consists of a central disc *or area* with six projecting arms *or areas* arranged around its perimeter, the arms being equally spaced and the end of the arms being rounded, it is clear that discs of other shapes could be utilized without deviating from the principles and innovations set forth in this invention.

Thus, the number of projecting arms as represented by (a) in Figure 1 may be increased or decreased, but cannot be less than two without deviating from the advantages and unique features of the invention described here. The number of such projecting arms and hence the number of different substances that can be separately studied on the same disc is a function primarily of the size of the disc desired and the degree of activity of the agents impregnated in the discs. For example, if it were desired to study the inhibition of the growth of bacteria inoculated onto the petri dish by relatively high concentrations of antibiotics, then the diameters of the zones of inhibition may be relatively large, thus interfering with each other should large degrees of inhibition occur on two neighboring arms (a); the number of arms would have to be decreased accordingly to avoid this interference.

Although the projecting arms as illustrated by (a) in Figure 1 are shown arranged around the perimeter of a disc, it is clear that a geometrical figure other than circular, said figure having projecting arms such as those illustrated by (a) in Figure 1 arranged around its perimeter could be used without deviating from certain of the advantages and unique features of the invention described herein.

In our experience, using the commonly employed petri dish having a diameter of approximately 9 cm., it has been found that a disc having a total diameter of approximately 4 cm. and six arms such as those represented by (a) in Figure 1, will leave, when placed in the center of the petri dish, a maximum distance of approximately 25 mm. for measurement of a zone of inhibition, from the tip of one of the arms (a) to the inner edge of the petri dish. This maximum possible diameter of the zone of inhibition is more than sufficient to assess the activity of agents impregnated into the various arms (a) without undue interference from zones of inhibition occurring adjacently. However, if larger or smaller petri dishes are utilized, it is clear that the overall size of the disc and/or the number of projecting arms may be altered without deviating from the advantages and unique features of the invention described herein.

The tips of the projecting arms (a) as illustrated in Figure 1 are represented as being equally spaced around the perimeter of the disc and of equal length, since such an equal spacing and length of the arms is most efficient when using a petri dish having a circular shape by making available equal areas per projecting arm for measuring zones of inhibition. However, should it be desired to utilize a petri dish or other container having a shape other than circular, the lengths of the projecting arms and their distribution around the perimeter of the disc may be varied for greater efficiency without deviating from the advantages and unique features of the invention described here.

Having now set forth the nature and objects of my invention, what I claim as new and useful and of my own invention, and desire to secure by Letters Patent is:

1. For use in assessing the activity of chemical agents in relation to micro-organisms, an essentially flat sheet of absorbent material, said sheet having a central area and a plurality of radially extending arms spaced about the periphery of said central area, the outer terminal areas of said arms being impregnated with different chemical compounds having activity in relation to microorganisms.

2. For use in assessing the activity of chemical compounds in relation to micro-organisms, a sheet of absorbent material, said sheet having a central area and a plurality of outwardly extending arms spaced about the periphery of said central area, the terminal outer ends of each of said arms being impregnated with the same chemical compound, the strength of said compound varying from arm to arm.

3. For use in assessing the activity of chemical agents a plurality of substantially flat, generally curved disk-like areas of absorbent material, said areas being spaced one from the other and joined one to the other by *additional* areas of the same material, said *first named* areas *projecting radially from said additional areas and* being impregnated with chemical agents.

4. A testing device for use in assessing [pre-determined properties of chemical agents] *the activity of chemical agents in relation to microorganisms,* said testing device comprising a member formed entirely of an absorbent material, said member having chemical agent-carrying portions spaced thereon *and extending therefrom,* said portions being joined by integral portions of the same material and of the same thickness.

5. Means for assessing the activity of chemical agents including an essentially flat sheet of absorbent material having a plurality of *laterally extending* arms, said arms being spaced one from the other, each of said arms individually carrying at the outer terminal *free* end thereof, solutions of the same chemical agent.

6. A testing device for use in testing substances which comprises an essentially flat, integral piece of absorbent material having a plurality of peninsular areas individually impregnated with said substances.

*7. Means for assessing the activity of chemical agents in relation to micro-organisms, comprising an essentially flat integral device formed entirely of absorbent material,*

*said device having a plurality of circumferentially spaced portions, each of said portions having a chemical agent carried thereby, each of said portions extending laterally from the remainder of said device.*

*8. Means useable in the determination of the activity of anti-biotic substances in relation to micro-organisms, comprising an essentially flat piece of absorbent material having a plurality of laterally extending integral portions, said portions being spaced one from the other on said piece and extending from an edge of said piece, said portions individually carrying, at the outer free end thereof, said anti-biotic substances.*

References Cited in the file of this patent or the original patent

UNITED STATES PATENTS

| | | |
|---|---|---|
| 1,512,893 | Fulweiler | Oct. 21, 1924 |
| 2,129,754 | Yagoda | Sept. 13, 1938 |
| 2,249,867 | Snelling | July 22, 1941 |
| 2,278,339 | Vollmer | Mar. 31, 1942 |
| 2,672,432 | Goetz | Mar. 16, 1954 |

OTHER REFERENCES

De Beer et al.: Jour. Bact., October 1945, pages 459 to 467.

Hoyt et al.: Science, 106, 1947, page 171.

Severens: Bacteriological Proceedings, 1950, page 65.

Bailey: Canadian Jour. of Public Health, vol. 44, December 1953, pages 468 to 475.